United States Patent Office 3,424,415
Patented Jan. 28, 1969

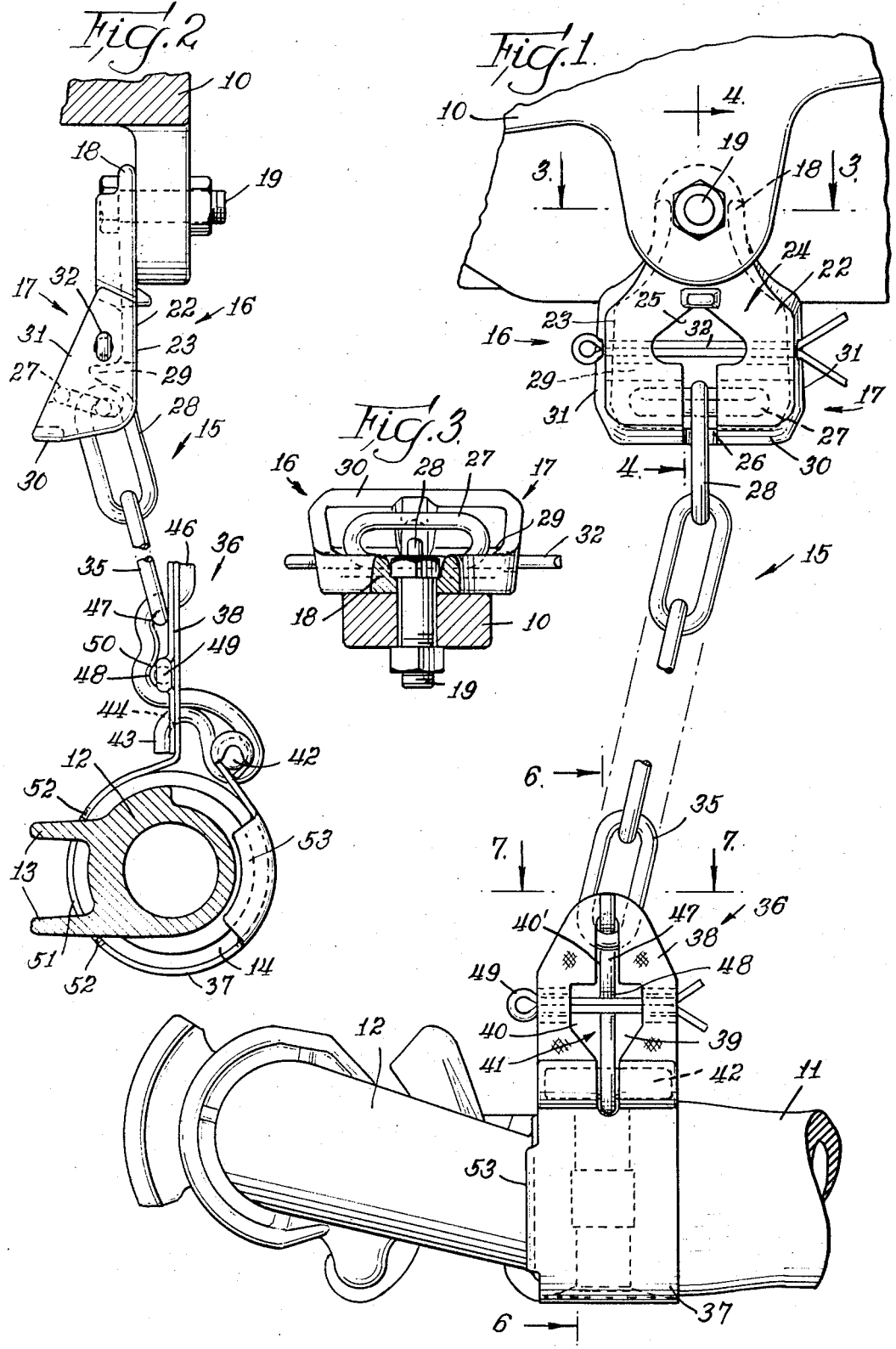

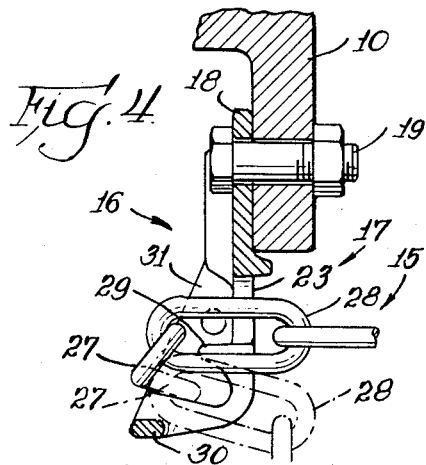
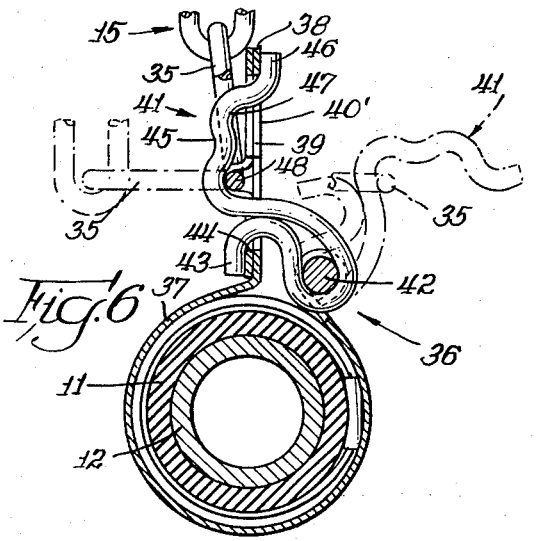
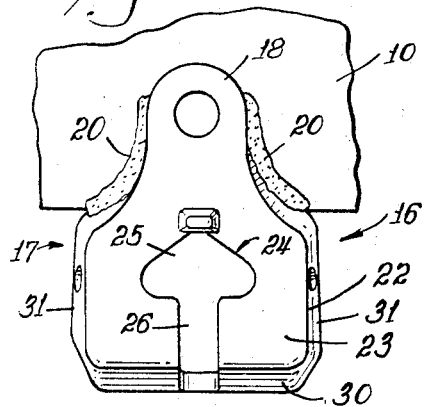
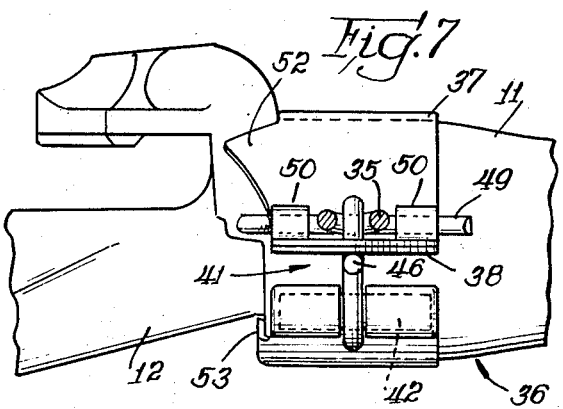
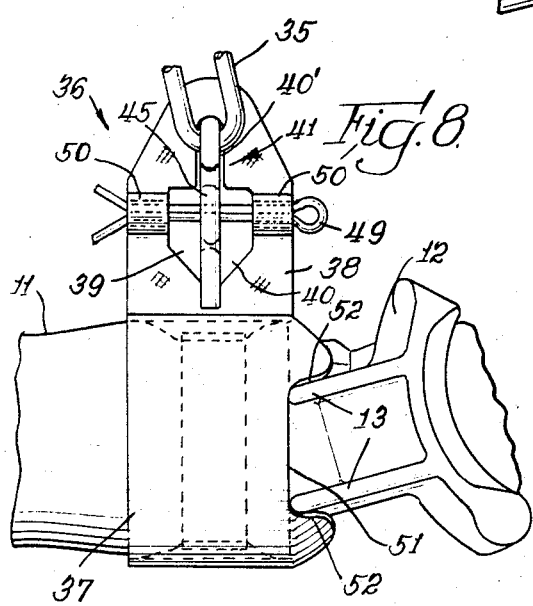
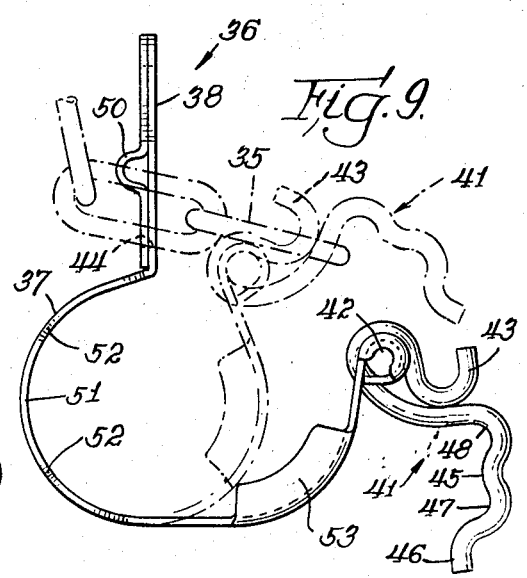

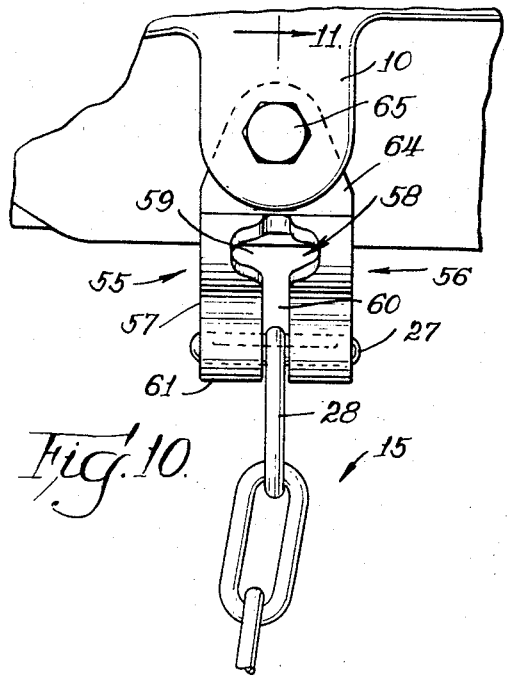
Fig. 10.
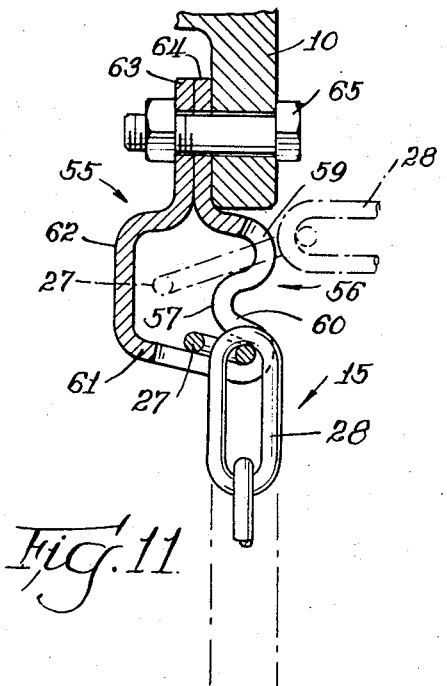
Fig. 11.
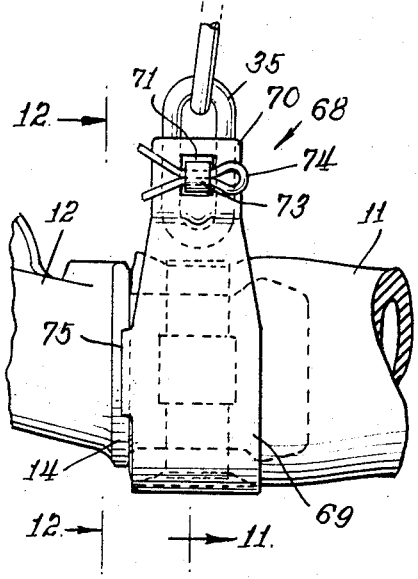
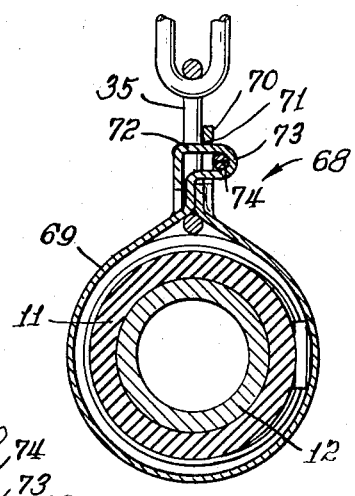
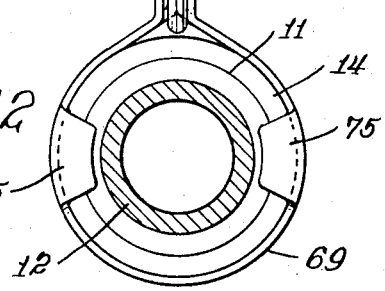
Fig. 12.

3,424,415
CHAIN LOCKS AND CHAIN DETACHABLE THEREFROM FOR SUPPORTING A RAILWAY CAR AIR BRAKE HOSE
Rudolph E. Nadherny, Naperville, Ill., assignor to Illinois Railway Equipment Company, Chicago, Ill., a corporation of Illinois
Filed Feb. 3, 1967, Ser. No. 613,803
U.S. Cl. 248—53           18 Claims
Int. Cl. F16l 3/16; B61h 13/38

ABSTRACT OF THE DISCLOSURE

A chain lock is secured to a railway car and another chain lock is secured to the distal end of the air brake hose to and from which end links of a support chain can be readily attached and detached without requiring special tools. The chain lock on the car has a T-shaped slot with the head portion receiving one link of the chain horizontally and the stem portion receiving the next link vertically. Shelves extend below the head portion and below and above the horizontal link. The chain lock at the distal end of the air hose includes a clamping band with a longitudinally slotted radially extending portion at one end to receive therethrough a keeper rotatably mounted on the other end.

---

In order to prevent the distal ends of uncoupled railway air brake hoses and the hose couplings therefor from being caught in frogs, switches and the like, each is provided with a chain one end of which is bolted to the car and the other end is bolted to a clamp which secures the coupling to the hose. In service the chains wear due to constant vibration while the car is moving. Worn or broken chains must be replaced. To do this it has been necessary to remove the bolts. It is difficult to accomplish this with the result that a car inspector may allow a car to remain in service on which one or both chains should be replaced.

Among the objects of this invention are: To provide for simply, quickly and easily disconnecting the ends of air brake hose supporting chains from the hose and the railway car to which they are attached; for this purpose to provide chain locks on the car and hose to and from which end links of the chain can be readily applied and removed without requiring the use of special tools; to secure to the car by bolting or welding a chain lock fitting having a T-shaped slot through which the top two links can be inserted far enough to permit the top link to be turned to a position transversely of the stem of the slot while encircled by the next link so that tension applied to the latter moves the transverse top link into holding engagement with the fitting; and to connect the bottom link of the chain to a clamping band at the distal end of the air brake hose adjacent the hose coupling by a readily attachable and detachable connection.

According to this invention the chain lock fitting attached to the car is in the form of a drop forging or steel pressing that is provided with a T-shaped slot through the head portion of which the top two links can be inserted far enough to permit the top link to be turned to a position transverse to the stem of the slot so as to bear against the rear or inner side of the fitting when tension is applied to the next link. The bottom link, in one embodiment, extends around a keeper that is rotatably mounted at one end of a clamping band that encircles the distal end of the air brake hose. A latch hook on the keeper overlies the bottom of a T-shaped slot in the portion of the clamping band which extends radially from its other end in clamping position while an intermediate portion of the keeper projects through the upper part of this T-shaped slot and is encircled by the bottom chain link which first was inserted through this slot to engage the keeper in unclamped position and then was pulled through this slot to clamping position. In another embodiment the bottom link of the chain encircles a reverse bend portion at one end of the clamping band which projects through a slot in a radially extending portion at the other end and is held there by a removable pin.

In the drawings: FIG. 1 is a view, in side elevation of chain lock means applied to a portion of a railway car and connected by a chain to chain lock means applied to the distal end of an air brake hose. FIG. 2 is a view, partly in section and partly in side elevation, of the construction shown in FIG. 1. FIG. 3 is a horizontal sectional view taken generally along the line 3—3 of FIG. 1. FIG. 4 is a vertical sectional view taken generally along the line 4—4 of FIG. 1. FIG. 5 is an elevation showing an alternate arrangement for securing the chain lock fitting to a portion of the railway car. FIG. 6 is a vertical sectional view taken generally along the line 6—6 of FIG. 1. FIG. 7 is a plan view taken generally along the line 7—7 of FIG. 1, the bottom chain link being shown in section. FIG. 8 is a view in side elevation of the chain lock means secured to the distal end of the air brake hose, the view being taken from the side opposite that in which the view shown in FIG. 1 is taken. FIG. 9 is a view which shows how the chain lock means is applied to the distal end of the air brake hose. FIG. 10 is a view, in side elevation, of a modified construction for detachably securing the ends of the chain to the railway car and to the distal end of the air brake hose. FIG. 11 is a vertical sectional view taken generally along the line 11—11 of FIG. 10. FIG. 12 is a vertical sectional view taken generally along the line 12—12 of FIG. 10.

In FIGS. 1 and 2 a portion of a railway car at one end is shown at 10. It will be understood that the portion 10 of the railway car is located at a fixed elevation above the rails on which the car moves. An air brake hose 11 is shown underneath the portion 10 of the railway car. It will be understood that it is connected to an air brake line which extends between the ends of the railway car. A hose coupling 12 is secured to the distal end of the air brake hose 11. It has laterally extending flanges 13 and a radially extending flange 14.

In order to support the distal end of the air brake hose 11 and the hose coupling 12 so that they do not fall below a predetermined distance from the portion 10 of the car, a chain shown generally at 15, is employed. The length of the chain 15 is such that the distal end of the air brake hose 11 and the hose coupling 12 always are held above the elevation of frogs, switches and the like to the end that they will not be accidentally engaged thereby.

As pointed out above it is desirable that provision be made for readily and simply attaching and detaching the upper end of the chain 15 to and from an anchor position on the portion 10 of the railway car. For this purpose chain lock means, indicated generally at 16, is provided. The chain lock means 16 includes a chain lock fitting 17 that may be drop forged steel. As shown in FIGS. 3 and 4 the chain lock fitting 17 has an upstanding integral ear 18 that is secured by a bolt 19 to the portion 10 of the railway car. Instead of the bolt 19, the chain lock fitting 17 can be secured to the portion 10 of the railway car by a weldment as indicated at 20 in FIG. 5.

The chain lock fitting 17 has a body 22 which is formed, in part, by a front wall 23 in which there is located a T-shaped slot 24 which has a head portion 25 and a stem portion 26. As shown in FIG. 4 one or a top link 27 of the chain 15 and the next link 28 can be inserted through the T-shaped slot 24. For accomplishing this the one or top link 27 is positioned horizontally to enter the head portion 25 and the next link 28 is positioned vertically to enter the stem portion 26. If desired, more than the first two links can be inserted. The links are inserted far enough to permit the one or top link 27 to be turned through a quarter revolution. Then when tension is applied to the chain 15 and particularly to the next link 28, the one or top link 27 is drawn into a position transverse to the stem portion 26 of the T-shaped slot 24 and in engagement with the rear side of the front wall 23. The next link 28 then encircles the one or top link 27 and extends outwardly and downwardly through the stem portion 26. In its operative position the one or top link 27 underlies an upper or first shelf 29 that is formed integrally with the chain lock fitting 17 and extends rearwardly from the front wall 23. Below the upper or first shelf 29 is a lower or second shelf 30 which forms the lower wall of the chain lock fitting 17 and into which the lower end of the stem portion 26 of the T-shaped slot 24 extends. The chain lock fitting 17 has integral side walls 31 which extend rearwardly from the front wall 23 and a removable pin or cotter key 32 extends therethrough for the purpose of insuring that the one or top link 27 does not become displaced from its position as shown in FIG. 1. While it has been found that the likelihood of the one or top link 27 being displaced accidentially is remote, the removable pin 32 is provided to make certain that the attachment of the upper end of the chain 15 to the chain lock fitting 17 cannot be accidentially removed.

When the chain 15 becomes worn or breaks, it is a simple matter to remove and replace it without any special tools. First the pin 32, if used, is removed. Then the next link 28 is moved rearwardly through the stem portion 26 of the T-shaped slot 24 far enough to permit the one or top link 27 to be swung through a quarter revolution and lifted above the upper or first shelf 29 whereupon the links 27 and 28 can be withdrawn from the chain lock fitting 17. A new chain is replaced by reversing these steps.

At its lower end, as shown in FIG. 1, the chain 15 has a bottom link 35 that is arranged to be connected detachably to chain lock means, indicated generally at 36, and secured to the distal end of the air brake hose 11 to which the hose coupling 12 is applied. The chain lock means 36 includes a clamping band 37 that may be formed of sheet steel. The clamping band 37 has a radially extending end portion 38 which is provided with a longitudinally extending T-shaped slot 39. The slot 39 is inverted and has an enlarged lower portion for receiving the bottom link 35 and the adjacent links as shown in FIG. 9. On the other end of the clamping band 37 a keeper 41, preferably formed of spring wire, is rotatably mounted on a transverse pin 42. The keeper 41 has a hook portion 43, FIGS. 2 and 6, that is arranged to overlie the bottom 44 of the slot 39 in order to hold the ends of the clamping band 37 such that the band 37 is securely clamped to the distal end of the air brake hose 11. An offset intermediate portion 45 of the keeper 41 is arranged to be swung through the enlarged lower portion 40 of the T-shaped slot 39 and through stem portion 40' thereof to the position shown in FIG. 6 with distal end portion 46 in overlying engagement with the upper end of the radially extending end portion 38. The intermediate portion 45 of the keeper 41 has a curved portion 47 for receiving the lower end of the bottom link 35, FIG. 2, and another curved portion 48 to receive a removable pin 49 (if used) which extends transversely of the end portion 38 through loops 50 provided thereon.

Provision is made for holding the clamping band 37 against movement with respect to the air brake hose 11 and hose coupling 12. For this purpose a slot 51, FIG. 2, is formed in one side of the clamping band 37 for receiving the laterally extending flanges 13 of the hose coupling 12. Sides 52 of the clamping band 37 at the ends of the slot 51 are juxtaposed to the outer sides of the flanges 13 and thus prevent relative rotation. An inwardly extending radial flange 53 from the clamping band 37 overlies the radial flange 14 on the hose coupling 12. The radial flange 53 in conjunction with the bottom of the slot 51 prevent relative longitudinal movement of the clamping band 37 with respect to the air brake hose 11.

FIGS. 6 and 9 show how the chain 15 is applied to the chain lock means 36. The ends of the clamping band 37 are separated as shown in FIG. 9 and it is then applied to the distal end of the air brake hose 11. The bottom link 35 and the adjacent links are inserted through the enlarged lower portion or head portion 40 of the T-shaped slot 39 with the bottom link 35 encircling the keeper 41. Tension is applied to the chain 15 and it is drawn through the enlarged lower portion 40 of the T-shaped slot 39. This is accompanied by a clamping movement of the band 37 around the air brake hose 11 and rotation of the keeper 41 from the broken line positions shown in FIGS. 6 and 9 to the full line position shown in FIG. 6 where the offset intermediate portion 45 has been moved through the slot 39, the hook portion 43 overlies the bottom 44 of the slot 39 and the distal end portion 46 is juxtaposed to the upper end of the end portion 38 of the clamping band 37. Then tension is applied to the chain 15 and the lower end of the bottom link 35 is moved from engagement with the curved portion 48 to engagement with the curved portion 47 as shown in FIG. 2. Finally the pin 49 is inserted through the loops 50 underneath the curved portion 48. For detaching the lower end of the chain 15 from the chain lock means 36, these steps are reversed.

FIGS. 10, 11 and 12 show alternate constructions for the chain lock means 16 and chain lock means 36, previously described. As here shown chain lock means, indicated generally at 55, is arranged to be secured to the portion 10 of the railway car. The chain lock means 55 comprises a chain lock fitting 56 that is formed of bendable steel pressing having a reverse bend portion 57 which corresponds to the body 22 of the chain lock fitting 17 with the rearwardly extending upper or first shelf 29. A T-shaped slot 58 is provided in the reverse bend portion 57 and includes a head portion 59 and a stem portion 60 for receiving the one or top link 27 and next link 28 in the manner previously described. At the lower end of the reverse bend portion 57 there is a lateral extension 61 in which the stem portion 60 extends. The lateral extension 61 has a prolonged portion 62 that is spaced rearwardly from the reverse bend portion 57 and extends generally parallel thereto. An extension 63 from the portion 62 together with an extension 64 from the upper end of the reverse portion 57 are arranged to overlie the potion 10 of the railway car and to receive a bolt 65 which holds the chain lock fitting 56 securely in position. The links 27 and 28 of the chain 15 are applied to the chain lock fitting 56 and are removable therefrom in the manner previously described for the application and removal of these links to the chain lock fitting 17.

The bottom link 35 of the chain 15 is detachably connected by chain lock means, indicated generally at 68, to the distal end of the air brake hose 11. The chain lock means 68 includes a clamping band 69 which is a steel pressing. At one end the clamping band 69 has a radially extending end portion 70 in which is located a longitudinally extending slot 71 for receiving a reverse bend portion 72 from the other end of the clamping band 69. The reverse bend portion 72 provides a loop 73 which projects through the slot 71 and through which the removable pin 74 can be positioned for holding the assembly in place and in clamping engagement with the distal end of the air brake hose 11. Prior to insertion of the reverse bend portion 72 through the slot 71, the bottom link 35 is applied in encircling relation to the reverse bend portion 72 so that when the assembly is completed the lower end of the bottom link 35 is positioned underneath the juxtaposed ends of the clamping band 69.

Relative longitudinal movement between the clamping band 69 and the air brake hose 11 is prevented by radially inwardly extending flanges 75 which are arranged to overlie the radial flange 14 on the hose coupling 12.

I claim:
1. An improvement in a railway car construction having at each end an air brake hose connected at one end to an air line on said car and a hose coupling at its distal end for connection to a like coupling on the next car, wherein said improvement comprises:
   a chain connected at one end to said car, and
   a chain lock device detachably interconnecting the other end of said chain to said distal end of said air brake hose including
   a clamping band encircling said distal end of said air brake hose and having a longitudinally slotted radially extending portion at one end, and
   retaining means on the other end of said clamping band extending through said slotted portion and encircled by a link at said other end of said chain.
2. The improvement as set forth in claim 1 wherein said retaining means includes a keeper rotatably mounted on the other end of said clamping band and adopted to extend through said link for securing said band in place on said air brake hose.
3. The improvement as set forth in claim 2 wherein the distal end of said keeper in the clamping position of said clamping band overlies said radially extending portion on the side opposite said link at said other end of said chain.
4. The improvement as set forth in claim 2 wherein a hook portion from said keeper overlies the bottom of said slot in said slotted portion of said clamping band to receive said band in clamping position on said air brake hose.
5. The improvement as set forth in claim 2 wherein a removable pin is interposed between that portion of said keeper extending through said slotted portion of said clamping band and said slotted portion to prevent withdrawal of said portion of said keeper.
6. The improvement as set forth in claim 2 wherein said clamping band has a slot along one side to receive said hose coupling the sides of which prevent relative rotation and has a radially extending flange overlying said hose coupling to prevent relative endwise movement in cooperation with the bottom of said slot in said clamping band.
7. The improvement as set forth in claim 1 wherein said retaining means is in the form of a reverse bend portion providing a loop projecting through said radially extending portion, and a removable pin extends through said loop and holds said band in clamping position.
8. An improvement in a railway car construction having at each end an air brake hose connected at one end to an air line on said car and a hose coupling at its distal end for connection to a like coupling on the next car, wherein said improvement comprises:
   a chain connected at one end to said distal end of said air brake hose, and
   chain lock means mounted on said car and having a slot for receiving one link at the other end of said chain and a portion of the next link in interlocking relation whereby said chain is readily attachable to and detachable from said chain lock means,
   said slot being generally T-shaped with the head portion adapted to receive said one link horizontally and the stem portion adapted to receive the next link vertically,
   said chain lock means being adapted to allow movement of said one link through a quarter revolution to position one side thereof inside and transversely of said stem portion with said next link extending through said stem portion and encircling said one side of said one link, and
   said chain lock means having a first shelf extending below said head portion of said T-shaped slot and overlying the encircling portions of said one and said next links and a second shelf underlying said encircling portions of said one and said next links.
9. The improvement as set forth in claim 8 wherein: said chain lock means is a drop forging and a removable pin extends transversely thereof in overlying relation to said first shelf to prevent withdrawal of said chain links.
10. The improvement as set forth in claim 8 wherein:
a chain lock device detachably interconnects said one end of said chain to said distal end of said air brake hose and includes:
   a clamping band encircling said distal end of said air brake hose and having a longitudinally slotted radially extending portion at one end, and
   retaining means on the other end of said clamping band extending through said slotted portion and encircled by a link at said one end of said chain.
11. The improvement as set forth in claim 10 wherein: said retaining means includes:
   a keeper rotatably mounted on the other end of said clamping band and adapted to extend through said slotted portion and to receive a link at said one end of said chain for securing said band in place on said air brake hose.
12. The improvement as set forth in claim 11 wherein: the distal end of said keeper in the clamping position of said clamping band overlies said radially extending portion on the side opposite said link at said one end of said chain.
13. The improvement as set forth in claim 11 wherein: a hook portion from said keeper overlies the bottom of the slot in said slotted portion of said clamping band to secure said band in clamping position on said air brake hose.
14. The improvement as set forth in claim 11 wherein: a removable pin is interposed between that portion of said keeper extending through said slotted portion of said clamping band and said slotted portion to prevent withdrawal of said portion of said keeper.
15. The improvement as set forth in claim 11 wherein: said clamping band has a slot along one side to receive said hose coupling the sides of which prevent relative rotation and has a radially extending flange overlying said hose coupling to prevent relative endwise movement in cooperation with the bottom of said slot in said clamping band.
16. The improvement as set forth in claim 8 wherein: said chain lock means is formed of bendable metal having a reverse bend portion in which said T-shaped slot is located.
17. The improvement as set forth in claim 16 wherein: said chain lock means has a lateral extension from the bottom of said reverse bend portion that is prolonged in generally parallel spaced relation to said T-shaped slot.
18. The improvement as set forth in claim 10 wherein: said retaining means is in the form of a reverse bend portion providing a loop projecting through said radially extending portion, and
   a removable pin extends through said loop and holds said band in clamping position.

References Cited

UNITED STATES PATENTS

| | | | |
|---|---|---|---|
| 501,465 | 7/1893 | Moran | 137—349 |
| 1,012,514 | 12/1911 | Brown | 248—53 |
| 1,121,522 | 12/1914 | Merryweather | 137—349 |
| 1,633,020 | 6/1927 | Ingram | 24—116 |

FOREIGN PATENTS

| | | |
|---|---|---|
| 290,203 | 6/1965 | Netherlands. |

CHANCELLOR E. HARRIS, *Primary Examiner.*

R. P. SEITTER, *Assistant Examiner.*

U.S. Cl. X.R.

137—349; 138—107; 248—328